March 7, 1944.  G. E. BOCK  2,343,638
HOISTING APPARATUS
Filed Feb. 12, 1943  3 Sheets-Sheet 2
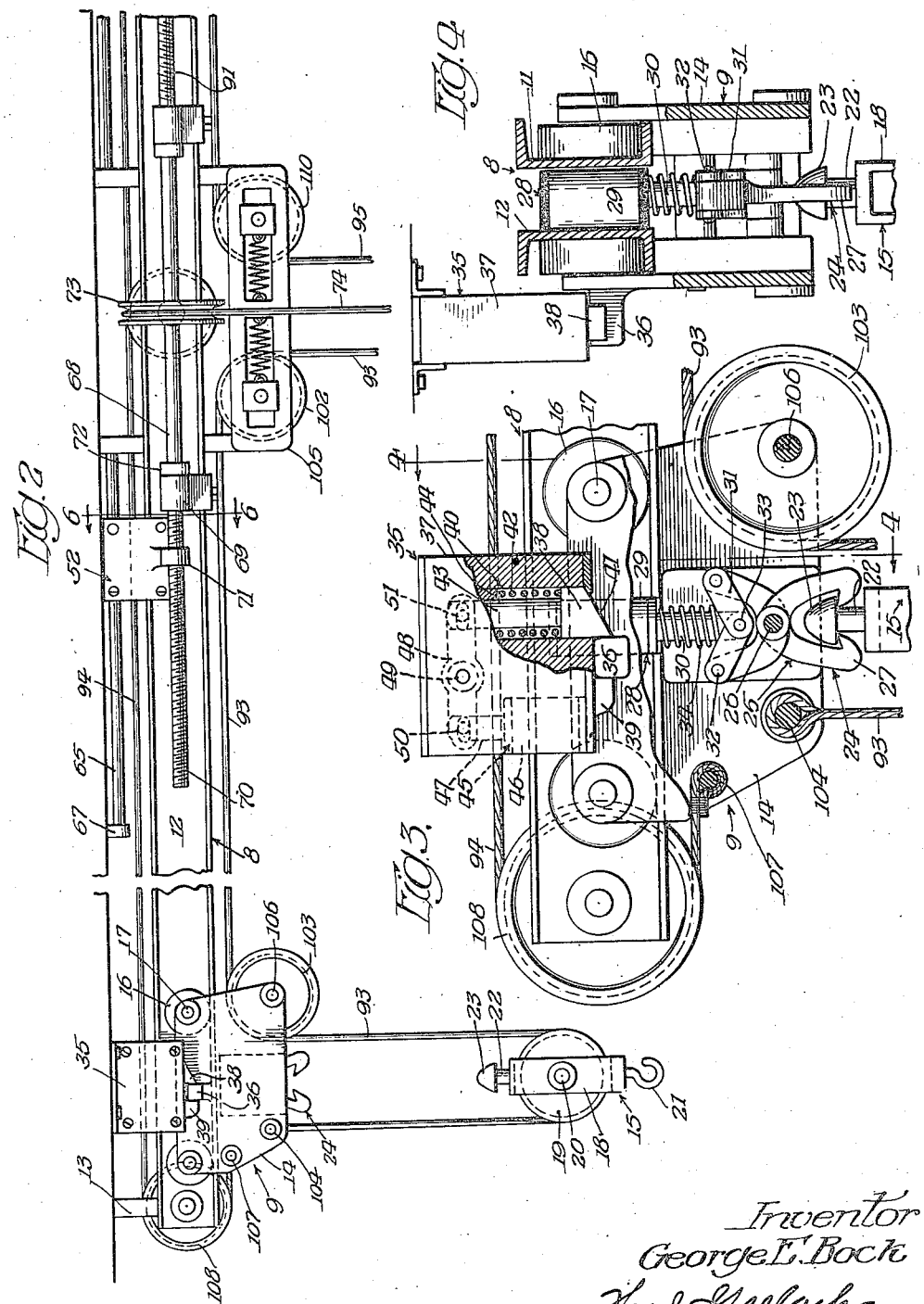
Inventor
George E. Bock
By Fred Gerlach
Atty.

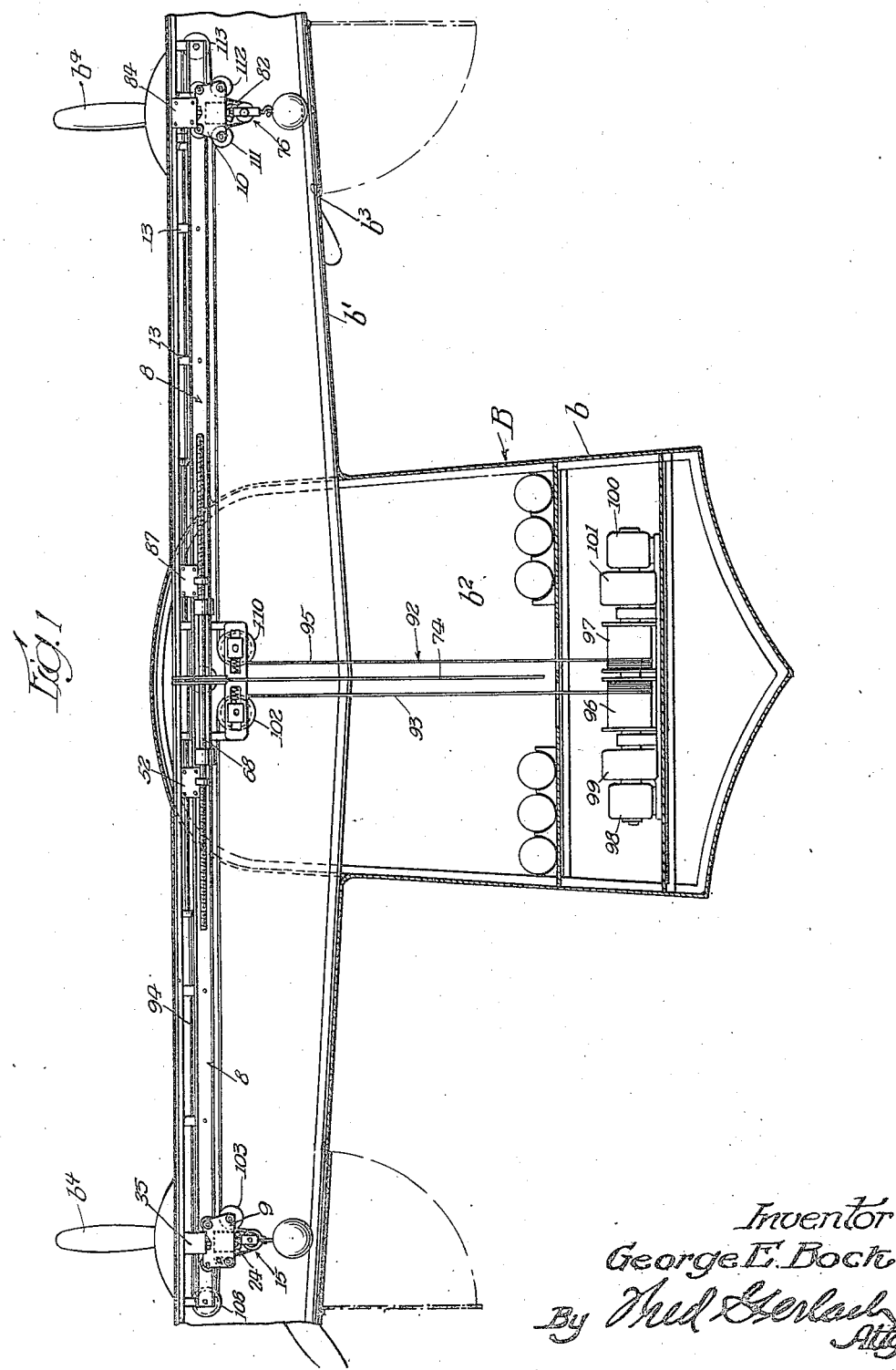

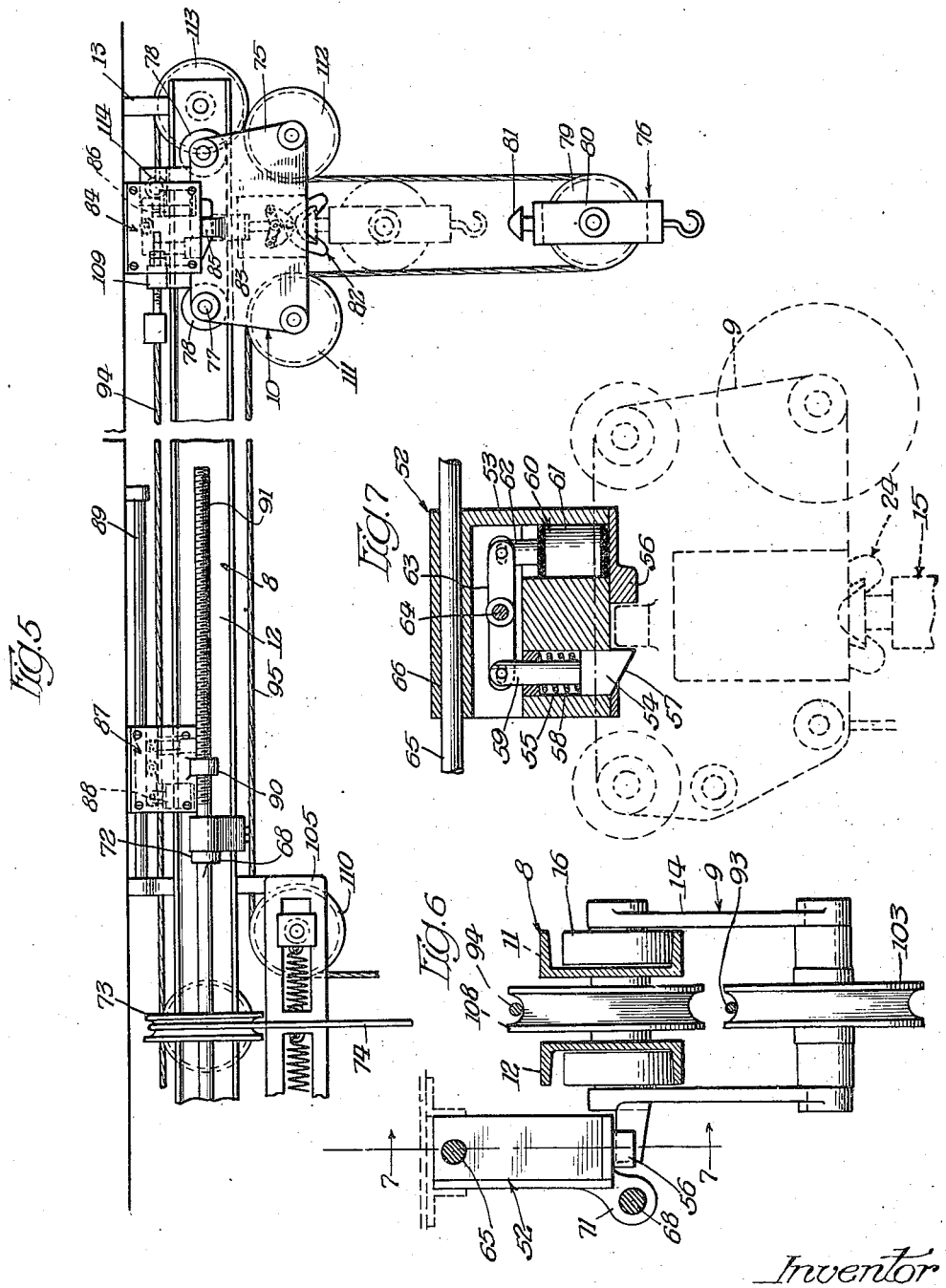

Patented Mar. 7, 1944

2,343,638

UNITED STATES PATENT OFFICE 2,343,638

HOISTING APPARATUS

George E. Bock, Chicago, Ill., assignor to Whiting Corporation, Harvey, Ill., a corporation of Illinois Application February 12, 1943, Serial No. 475,632

13 Claims. (Cl. 212—126)

The present invention relates generally to hoisting apparatus. More particularly the invention relates to that type of hoisting apparatus which has special utility in a vehicle wherein the maintenance of lateral stability is of prime importance and serves as a medium for handling or shifting cargo from one location to another.

One object of the invention is to provide a hoisting apparatus of this type which is an improvement upon, and has certain advantages over, previously designed apparatus for the same purpose, and is characterized by the fact that it is extremely efficient in operation, and is so designed and constructed that the cargo may be handled symmetrically in, and without affecting or disturbing lateral stability of, the vehicle with which the apparatus is associated.

Another object of the invention is to provide a hoisting apparatus of the type under consideration comprising an elongated track which is mounted on, and extends transversely of, the vehicle, a pair of wheel equipped trucks which are mounted to travel on the ends of the track and have vertically movable cable supported load or cargo carrying blocks therebeneath, and mechanism for conjointly shifting the trucks to and from one another in connection with cargo handling operations.

Another object of the invention is to provide in connection with a hoisting apparatus of the type and character last mentioned, latches at the ends of the track for releasably locking the wheel equipped trucks after they are conjointly shifted outwards to their fullest extent, latches adjacent the central portion of the track for releasably locking the trucks upon conjoint inward shift thereof, latches for releasably locking the blocks to the trucks when they are raised to their fullest extent, and a single cable system which is so arranged and designed that it is operative—(1) to lower or raise the blocks conjointly after the trucks are locked in place and the latches for locking the blocks to the trucks are released, (2) to shift the trucks conjointly inwards after the blocks are locked to the trucks and the latches at the ends of the track are released, and (3) to shift the trucks conjointly outwards along the track after the blocks are locked to the trucks and the latches adjacent the inner portion of the track are released.

A further object of the invention is to provide a hoisting apparatus of the aforementioned type and character in which the inner truck-latches, i. e., the latches adjacent the central portion of the track, are adjustable longitudinally of the track to and from one another.

A still further object of the invention is to provide a hoisting apparatus which is generally of new and improved construction and in which high efficiency is combined with simplicity and compactness of design.

Other objects of the invention and the various advantages and characteristics of the present hoisting apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a transverse section through the wing and hull of a flying boat having applied thereto a hoisting apparatus embodying the invention, illustrating the arrangement and design of the apparatus and showing the manner in which the trucks are adapted to move loads, such as bombs, from the hull into the inner portions of the outboard wing sections of the flying boat for discharge through the usual door-closed hatches;

Figure 2 is a fragmentary side elevation of the left hand end of the track and the truck that is associated therewith;

Figure 3 is a side view of the truck on the left hand end of the track, parts being broken away and other parts being shown in section in order to illustrate the construction and design of the releasable block latch and the releasable truck latch at the outer extremity of the left hand end of the track;

Figure 4 is a transverse section on the line 4—4 of Figure 3;

Figure 5 is a fragmentary side view of the right hand end of the track and the block equipped truck that is associated therewith;

Figure 6 is an enlarged transverse section taken on the line 6—6 of Figure 2 and illustrating the construction and design of the adjustable latches for locking the trucks at the end of conjoint inward shift thereof; and Figure 7 is a longitudinal section on the line 7—7 of Figure 6.

The hoisting apparatus which is shown in the drawings constitutes the preferred form or embodiment of the invention. It is illustrated in connection with, and as forming a part of, a flying boat B and serves as a medium for shifting cargo, such, for example, as bombs, from one location to another in the flying boat. The flying boat is illustrated diagrammatically in Figure 1 of the drawings and represents one type of vehicle with which the improved hoisting apparatus is especially adapted for use. It is of conventional design or construction and comprises a hull $b$ and a wing $b^1$ at the upper portion of the hull. The hull is adapted to float on water when the boat is not in flight. It embodies at the tail end thereof an empennage (not shown) and has in its central portion a storage space $b^2$ for bombs or other cargo. The wing $b^1$ serves as the main or primary supporting surface for the flying boat and embodies a pair of outboard sections which project in opposite directions from the upper portion of the hull $b$. The inner, lower portions of the outboard sections of the wing are provided with door-closed hatches $b^3$. The latter make it possible to load the flying boat with bombs and also permit the bombs to be dropped. Engine driven propellers $b^4$ are associated with the wing $b^1$ and provide the propulsion means for the flying boat B. The hoisting apparatus is brought into play in connection with loading of the flying boat with bombs or like cargo, and is adapted to raise the bombs through the hatches $b^3$ into the inner portions of the outboard wing sections, then move the bombs into the upper portion of the storage space $b^2$ and then lower the bombs into the storage space $b^2$ in the hull for storage purposes. It is also adapted in connection with discharge of the bombs from the flying boat to raise the bombs to the upper portion of the storage space $b^2$, then shift the bombs outwards through the outboard sections of the wing into a discharge position wherein they overlie the hatches $b^3$. In a flying boat of the type herein disclosed the bombs are retained in the storage compartment $b^2$ in the hull $b$ until shortly before the flying boat approaches its objective or target. Thereafter the bombs are manipulated by the hoisting apparatus into their discharge position wherein they are disposed over the hatches $b^3$ in readiness to be released upon opening of the doors for the hatches. As hereinafter described, the hoisting apparatus is so designed and constructed that it permits the bombs to be loaded into the hull and shifted from the hull into their discharge position in the inner portions of the outboard wing sections without disturbing or affecting lateral stability of the flying boat.

As its main parts the hoisting apparatus comprises an overhead track 8 and a pair of trucks 9 and 10. The track extends transversely of the flying boat B and is arranged so that the central portion thereof extends across the upper portion of the storage space $b^2$ and its ends project into the inner portions of the outboard wing sections to points slightly outwards or beyond the door-closed hatches $b^3$. The ends of the track project equal distances into the inner portions of the outboard wing sections, as shown in Figure 1. The track consists of a pair of parallel, laterally spaced channel beams 11 and 12. The beam 11 is located in front of the beam 12 and is arranged so that the flanges thereof project forwards. The rear beam, that is, the beam 12, is arranged so that its flanges project rearwards. The track 8 is supported by way of hangers 13 which are suitably attached to, and depend from, the inner upper portions of the outboard sections of the wing $b^1$. The truck 9 is associated with, and adapted to travel along, the left hand end of the track 8, as viewed in Figures 1 and 2, and the truck 10 is associated with, and adapted to travel along, the right hand end of the track. As described hereafter, the two trucks are conjointly shiftable to and from one another.

The truck 9 comprises a pair of parallel, laterally spaced plates 14 and has a hoist block 15 associated with it. The plates 14 are suitably cross connected and straddle the track 8. In addition to the plates 14 the truck 9 comprises four wheels 16. The latter are mounted on inwardly extending stub axles 17 on the upper corners of the truck plates 14 and are arranged to travel along the lower flanges of the channel beams constituting track 8. The block 15 is disposed beneath the truck 9. It is movable vertically to and from the truck, as hereinafter described and comprises a frame 18 and a vertically extending sheave 19. The frame surrounds the sheave and carries a stub axle 20 for rotatably supporting the sheave. The lower portion of the frame 18 of the block 15 is provided with a depending hook 21 for attachment to the bomb or other load to be handled. The upper portion of the frame embodies an upstanding shank 22 having a large conoidal head 23 at its upper end. A latch 24 on the truck 9 serves releasably to lock the block 15 to the truck when it is raised or elevated to its fullest extent. This latch is disposed between the plates 14 of the truck 9 and comprises a pair of crossed upstanding levers 25. A pivot pin 26 extends through holes in the central portion of the levers 25 and serves to support the levers so that they are free to swing to and from one another. The lower ends of the levers are provided with inwardly extending hooks 27 and these are adapted to snap into hooked relation with the conoidal head 23 on the upper portion of the frame of the block 15 when the block is raised or elevated to a point wherein it is disposed adjacent the truck 9. The latch 24 is released by way of a solenoid 28. The latter is disposed between the central upper portions of the plates 14 of the truck 9 and comprises a vertically extending helix or coil 29 and a vertically slidable armature 30. The upper end of the armature fits within the coil 29. The lower end of the armature is operatively connected to the upper ends of the levers 25 by way of a pair of links 31. The latter extend inwards and downwards, as shown in Figure 3, and have the outer ends thereof pivotally connected to the upper ends of the latch levers 25 by means of pivot pins 32. The inner ends of the links are pivotally connected to the lower end of the armature by way of a pivot pin 33. When the solenoid 28 is energized by supplying electric current to the helix of coil 29 the armature is retracted upwards and operates through the medium of the links 31 to swing apart the levers 25 and thus release the latch 24. A compression spring 34 surrounds the lower end of the armature 30 and serves to swing the latch levers 25 toward one another into their operative position when the solenoid 28 is de-energized. The upper end of the spring abuts against the bottom portion of the container for the solenoid coil 29 and the lower end of the spring engages the inner ends of the links 31. When the block 15 is raised to its fullest extent the conoidal head 23 moves into engagement with the hooks 27 and then passes upwards beyond the hooks. During movement of the head past the hooks the levers are swung apart. As soon as the head passes the hooks the levers, in response to the action of the compression spring 34, swing inwards into a position wherein the hooks are in hooked or locked relation with the head (see Figure 3). When it is desired to release the latch in order to permit lowering of the block the solenoid 28 is energized.

A latch 35 serves releasably to lock the truck 9 when it is shifted outwards to its fullest extent. This latch coacts with a rearwardly extending lug 36 on the central upper portion of the rear side plate of the truck 9 and is suitably supported from above so that it is positioned rearwards and slightly inwards of the left hand extremity of the track 8. It is supported separately from the track and comprises a box-like housing 37, and a vertically slidable latch bolt 38. The housing embodies on the under side thereof a depending stop lug 39. This lug coacts with the lug 36 on the truck 9 to limit outward movement of the truck. The truck when shifted outwards to its fullest extent is brought to rest when the lug 36 thereon engages or abuts against the lug 39 on the underside of the latch housing 37. The latch bolt 38 is mounted for vertical sliding movement in a bore 40 in the latch housing 37 and is positioned in opposed relation with the lug 39. It is positioned from the lug 39 a distance slightly greater than the width of the lug 36 on the truck 9 and has a beveled or cam type bottom face 41. When the truck 9 is shifted outwards the lug 36, directly before it abuts against the stop lug 39, engages the bottom face 31 of the latch bolt 38 and forces the latch bolt upwards. As soon as the lug 36 passes the bolt 38 the latter snaps downwards into a truck locking position in response to the action of a compression spring 42. The latter is located in the bore 40 and surrounds an upstanding stem 43 at the upper end of the latch bolt 38. The lower end of the spring 42 abuts against the upper face of the latch bolt 38 and the upper end of the spring abuts against a shoulder 44 at the upper end of the bore 40. A solenoid 45 serves to release the latch when it is desired to shift the truck 9 inwards along the left hand end of the track 8. This solenoid is mounted in the housing 37 and comprises a helix or coil 46 and a vertically slidable armature 47. The upper end of the armature is operatively connected to the upper end of the stem 43 by way of a lever 48 in the upper portion of the latch housing 37. This lever is centrally fulcrumed on a pivot pin 49 and has one end thereof connected to the upper end of the armature 47 by way of a pin and slot connection 50. The other end of the lever is connected to the upper end of the stem 43 by way of a pin and slot connection 51. When the solenoid 45 is energized by supplying electric current to the helix or coil 46 the armature 47 is retracted downwards and operates through the medium of the centrally fulcrumed lever 48 to raise the latch bolt 38 out of engagement with the lug 36. When the latch bolt 38 is raised or retracted into a position wherein it is in disengaging relation with the lug 36 the truck 9 is freed or released and hence may be shifted inwards along the track 8.

A latch 52 serves releasably to lock the truck 9 upon inward shift thereof into the storage space $b^2$ in the hull $b$ of the flying boat B. This latch is similar in design and construction to the latch 35 but is reversely positioned. It is located rearwards of the central portion of the track 8 and comprises a housing 53 and a vertically slidable latch bolt 54. The housing is provided with a vertical bore 55 in which the latch bolt 54 is mounted for vertical sliding movement. It also embodies a depending lug 56 and this lug forms an abutment or stop for the truck lug 36 after such lug passes the latch bolt 54. The lug 56 and the latch bolt 54 are spaced apart a distance slightly greater than the width of the truck lug 36. The latch bolt has a beveled or cam type bottom face 57 and is urged downwards into its operative or truck locking position by way of a compression spring 58 which is mounted in the bore 55 and surrounds an upstanding stem 59 on the upper end of the latch bolt 54. The latch 52 is released by way of a solenoid 60. The latter is mounted in the latch housing 53 and comprises a helical winding 61 and a vertically slidable armature 62. The upper end of the armature is operatively connected to the upper end of the stem 59 by way of a lever 63 which is centrally fulcrumed by way of a pivot pin 64 and has the ends thereof connected by pin and slot connections to the upper ends of the armature 62 and the stem 59. When the solenoid 60 is energized by supplying current to the coil 61 the armature 62 is retracted downwards and operates through the medium of the lever 63 to raise the latch bolt 54 out of engagement with the truck lug 36. When the truck 9 is shifted inwards along the left hand end of the track 8 into the upper portion of the storage space $b^2$ the lug 36 passes under the latch bolt 54 and then moves into abutment with the top lug 56 on the bottom of the latch housing 53. During passage of the lug 36 past the latch bolt 54 the latch bolt is raised against the force of the compression spring 58 by the camming action which is produced by the beveled or cam type bottom face 57 of the bolt. After the lug 36 passes the latch bolt and strikes the stop lug 56 the spring 58 forces the latch bolt downwards into its truck locking position. When it is desired to release the latch 52 so as to free the truck 9 for outward travel along the left hand end of the track 8 the solenoid 60 is energized, as hereinbefore described. In order to permit spotting of the bombs or other cargo in the storage space $b^2$ the latch 53 is mounted so that it is adjustable lengthwise of the track 8. The adjustable mount for the latch 52 comprises a horizontal rod 65. This rod extends through a horizontal bore 66 in the upper portion of the latch housing 53. It is disposed in parallel relation with the track 8 and is supported at the ends thereof by way of a pair of brackets 67 which depend from the ceiling of the storage space $b^2$. Adjustment of the latch is effected by way of a screw shaft 68. This shaft is located rearwards of, and in parallel relation with, the central portion of the track 8 and is rotatably supported by way of a pair of bearing brackets 69. The latter are connected to, and project rearwards from, the central portion of the track beam 12 and are applied to the central portion of the screw shaft 68. The left hand end of the shaft 68 is provided with a screw thread 70 and extends through an internally threaded bore in a laterally extending lug 71 on the latch housing 53. The screw shaft 68 is held against longitudinal displacement by way of collars 72 which are fixed to the shaft and abut against the inner ends of the bearing brackets 69. When the shaft 68 is rotated in one direction the latch 52 is shifted outwards, that is, towards the left hand end of the track 8. Reverse rotation of the shaft 68 results in inward shift of the latch 52. Rotation of the shaft 68 for the purpose of adjusting the latch 52 is effected by way of a pulley 73 and an endless flexible element 74. The pulley is fixedly secured to the central portion of the screw shaft 68. The element 74 extends around the pulley and depends therefrom. It is in the form of a loop and is preferably formed of rope. By pulling on one side of the element 74 the screw shaft 68 may be rotated in one direction. Reverse rotation of the shaft is effected by pulling on the other side of the element 74.

The truck 10 is the same in design and construction as the truck 9 and comprises a pair of parallel, laterally spaced side plates 75. It is conjointly movable to and from the truck 9, as hereinafter described, and has associated therewith a hoisting block 76. The side plates 75 of the truck are arranged in straddled relation with the right hand end of the track 8 and have inwardly extending stub axles 77 at their upper corners. Wheels 78 are mounted on these stub axles and rest on, and are adapted to travel along, the lower flanges of the track beams 11 and 12. The hoisting block 76 is movable vertically to and from the truck 10 and comprises a sheave 79 and a frame 80. The latter correspond respectively to the sheave and frame of the block 15. The frame 80 has a hook at the lower portion thereof for attachment to a bomb or other load and embodies at the top a conoidal head 81. The latter is adapted to coact with a latch 82 to lock the hoisting block 76 to the truck 10 when it is raised to its fullest extent. The latch 82 is disposed between the central portions of the side plates 75 of the truck 10 and is constructed correspondingly to, and functions like, the latch 24. A solenoid 83 is associated with the latch 82 and serves to release the latter when it is desired to lower the hoisting block 76. The solenoid 83 is in circuit with the solenoid 28 so that the two latches 24 and 82 are releasable conjointly. A latch 84 adjacent and rearwards of the right extremity of the track 8 coacts with a laterally extending lug 85 on the rear side plate of the truck to lock the truck 10 when it is shifted outwards to its fullest extent. This latch is constructed in the same manner as, and functions like, the latch 35. It is released by way of a solenoid 86 and is spaced from the right extremity of the track 8 the same distance that the latch 35 is spaced from the left extremity of the track. The solenoid 86 is in circuit with the solenoid 45 in order that the two latches 35 and 84 are releasable conjointly. A latch 87 serves to lock the truck 10 when the latter is shifted inwards into the storage space $b^2$. This latch is the same construction as, and functions like, the latch 52 and has a solenoid 88 for releasing it. Such solenoid is in circuit with the solenoid 60 so that the latches 52 and 87 are releasable conjointly. The latch 87 is mounted for adjustment longitudinally of the track 8 by way of a rod 89 and has at the rear thereof a laterally projecting lug 90 with a horizontal internally threaded bore. The right hand end of the screw shaft 68 has a screw thread 91 and extends through the bore in the lug 90. The screw thread 70 at the left hand end of the screw shaft is a left hand thread and the screw thread 91 is a right hand screw thread with the result that turning or rotation of the screw shaft 68 results in conjoint or symmetrical adjustment of the latches 52 and 87. The two last mentioned latches are spaced equidistantly from the mid point of the track 8.

In addition to the track 8 and the wheel equipped trucks 9 and 10 the hoisting apparatus comprises a single cable system 92. This system consists of three cables 93, 94 and 95. It is controlled or actuated by a pair of coaxial drums 96 and 97 and operates to lower or raise the blocks 15 and 76 after the trucks are locked in place and the latches for locking the blocks to the trucks are released, to shift the trucks conjointly inwards after the blocks are locked to the trucks and the latches 35 and 84 are released, and to shift the trucks conjointly outwards along the track ends after the blocks are locked to the trucks and the latches 52 and 87 are released. The drums 96 and 97 extend crosswise or transversely of the hull $b$ of the flying boat B and are mounted in the lower portion of the storage space $b^2$ as shown in Figure 1. The drum 96 is driven in either direction by way of a reversible electric motor 98. A speed reducing unit 99 is interposed between the armature shaft of the motor 98 and the supporting shaft for the drum 96 and serves operatively to connect the drum for drive by the motor 98. The drum 97 is driven in either direction by means of an electric motor 100. The latter is positioned in opposed relation with the electric motor 98 for driving the drum 96 and is connected to the drum 97 by way of a speed reducing unit 101. The cable 93 of the system 92 extends between the truck 9 and the drum 96. One end of the cable 93 is wound around, and anchored to, the drum 96. The cable 93 extends upwards from the drum 96, then extends around an idler sheave 102, directly beneath the central portion of the track 8, then extends outwards under the left hand end of the track, then extends around a sheave 103 between the inner, lower corners of the side plates 14 of the truck 9, then extends downwards, then passes around the sheave 19 of the hoisting block 15, and then extends upwards to an anchor post 104 between the lower, outer corners of the side plates of the truck 9. The idler sheave 102 overlies the drum 96 and is supported by a bracket 105 which is disposed beneath and suspended from the central portion of the track 8. The sheave 103 is horizontally aligned with the idler sheave 102 and is supported rotatably by way of a stub axle 106 on the truck 9. The cable 94 serves to connect the two trucks together for conjoint inward and outward travel along the track ends. One end of the cable 94 is anchored to a post 107. This post extends between, and is secured to, the outer central portions of the side plates 14 of the truck 9. The cable 94 extends outwards from the anchor post 107, then passes half way around a sheave 108 between the left hand ends of the track beams 11 and 12, then extends lengthwise of the track. The other end of the cable is anchored to an upstanding lug 109 on the truck 10. When the trucks 9 and 10 are at the ends of the track and the latches 35 and 84 are released inward shift of the truck 9 results in the cable 94 shifting the truck 10 inwards. When the two trucks are adjacent the central portion of the track 8 and the latches 52 and 87 are released outward shift of the truck 10 results in the cable 94 shifting the truck 9 outwards. The cable 95 extends between the drum 97 and the truck 10. One end of the cable 95 is wound around, and anchored to, said drum 97. The cable 95 extends upwards from the drum 97, then extends around an idler sheave 110 beneath the central portion of the track 8, then extends outwards along the right hand end of the track, then extends around a sheave 111 between the inner, lower corners of the side plates 75 of the truck 10, then extends downwards, then extends around the sheave 79 of the hoisting block 76, then extends upwards, then extends around a sheave 112 between the outer, lower corners of the truck side plates 75, then extends outwards, then extends around a sheave 113 between the right hand ends of the track beams 11 and 12 and then extends inwards to an anchor lug 114 on the upper portion of the truck 10. The idler sheave 110 is mounted on the bracket 105 in opposed relation with the idler sheave 102. The idler sheaves 111 and 112 are rotatably supported on stub axles on the truck 10 When the trucks 9 and 10 are locked in place by the latches 35 and 84 or the latches 52 and 87 and the latches 24 and 82 are released conjoint drive of the drums 96 and 97 in such manner as to pay out the cables 93 and 95 results in conjoint lowering of the blocks 15 and 76. When the two drums are oppositely driven so as to effect winding up of the cables 93 and 95 the two blocks 15 and 76 are caused conjointly to raise. When the blocks 15 and 76 are locked to the trucks 9 and 10 by the latches 24 and 82 and the latches 35 and 84 are released while the trucks are at the ends of the track 8 reverse or opposite drive of the drums 96 and 97 so as to effect wind up of the cable 93 and pay out of the cable 95 results in conjoint inward shift of the two trucks. When the two blocks 15 and 76 are locked to the trucks by the latches 24 and 82 and the latches 52 and 87 are released while the trucks are adjacent the inner portion of the track reverse or opposite drive of the drums 96 and 97 so as to effect wind up of the cable 95 and pay out of the cable 93 results in conjoint outward shift of the two trucks.

The operation of the hoisting apparatus is as follows: When it is desired to load cargo, such as bombs, into the storage space $b^2$ in the hull $b$ of the flying boat B the trucks 9 and 10 are shifted outwards until they are locked in place at the ends of the track 8 by the latches 35 and 84. Thereafter the doors for the hatches $b^3$ are opened and the blocks 15 and 76 are lowered through the two hatches. Lowering of the blocks is effected by releasing the latches 24 and 82 and driving the drums 96 and 97 in such manner as to pay out the cables 93 and 95 of the cable system 92 When the blocks are lowered to the desired extent the bombs are attached to the blocks by the hooks on the lower portions of the block frames. After the bombs are attached to the blocks the blocks are raised until they become locked to the trucks 9 and 10 by the latches 24 and 82. Raising of the blocks is effected by conjointly driving the drums 96 and 97 so as to effect wind up of the cables 93 and 95. After the blocks are locked to the two trucks the trucks are moved conjointly inwards until they are locked in place by the latches 52 and 87. Conjoint inward shift of the two trucks is effected by releasing the latches 35 and 84 and driving the two drums so that the drum 96 winds up the cable 93 and the drum 97 pays out the cable 95. After the trucks are locked in the upper portion of the storage space $b^2$ by the latches 52 and 87 the blocks are lowered until the bombs are brought to rest in their proper place in the storage space $b^2$. The bombs are generally retained in the storage space until the flying boat B reaches the vicinity of its objective or target. When it is desired to discharge the bombs the blocks are attached to the bombs and are then hoisted until they become locked to the trucks by the latches 52 and 87. Thereafter the trucks are shifted outwards to the ends of the track 8 where they are automatically locked in place by the latches 35 and 84. Because of the position of the last mentioned latches the trucks hold the bombs in a position wherein they overlie the door-closed hatches $b^3$ and are in readiness to be dropped by suitable bomb discharging equipment Should it be desired to spot the bombs in the storage space $b^2$ in connection with a bomb loading operation the latches 52 and 87 may be adjusted outwards or inwards by turning of the screw shaft 68 in the manner heretofore described.

The herein described hoisting apparatus is both simple in design and efficient in operation and is characterized by the fact that it handles cargo in a symmetrical manner and without affecting or disturbing the lateral stability or equilibrium of the vehicle with which it is associated.

Whereas the improved hoisting apparatus has been described in connection with a flying boat it is to be understood that it may be used in other types of vehicles or elsewhere. It is also to be understood that the invention is not to be limited or restricted to the details set forth since these may be modified within the scope of the appended claims without departing from the spirit and scope of the invention.

Having thus described the invention what I claim as new and desire to secure by Letters Patent is:

1. A hoisting apparatus comprising an overhead track, a pair of trucks mounted to travel on the track and each provided with vertically movable hoist means, means for conjointly shifting the trucks to and from one another, latches for releasably locking the trucks when they are shifted into certain positions on the track, and means for conjointly releasing the latches, including a pair of solenoids associated with said latches respectively.

2. A hoisting apparatus comprising an overhead track, a pair of wheel equipped trucks mounted to travel on opposite ends of the track and each provided with vertically movable hoist means, means for conjointly shifting the trucks to and from one another, latches at the extremities of the track for releasably locking the trucks in place when they are shifted outwards to said extremities of the track, and means for conjointly releasing the latches, including a pair of solenoids associated with said latches respectively.

3. A hoisting apparatus comprising an overhead track, a pair of wheel equipped trucks mounted to travel on opposite ends of the track and each provided with vertically movable hoist means, means for conjointly shifting the trucks to and from one another, latches adjacent the central portion of the track for releasably locking the trucks in place when they are shifted inwards to said central portion of the track, and means for conjointly releasing the latches.

4. A hoisting apparatus comprising an overhead track, a pair of trucks mounted to travel on opposite ends of the track and each provided with vertically movable hoist means, means for conjointly shifting the trucks to and from one another, latches at the extremities of the track for releasably locking the trucks when they are shifted outwards to said extremities of the track, means for conjointly releasing said latches, latches adjacent the central portion of the track for releasably locking the trucks in place when they are shifted inwards to said central portion of the track, and means for conjointly releasing the last mentioned latches.

5. A hoisting apparatus comprising an overhead track, a pair of trucks mounted to travel on the track and each provided with vertically movable hoist means, means for conjointly shifting the trucks to and from one another, a pair of latches mounted adjacent, and for adjustment longitudinally of, the track and adapted releasably to lock the trucks when they are shifted into certain positions on the track, and means for conjointly adjusting the latches to and from one another, including an operative connection between said latches.

6. A hoisting apparatus comprising an overhead track, a pair of trucks mounted to travel on opposite ends of the track and each provided with vertically movable hoist means, means for conjointly shifting the trucks to and from one another, a pair of latches mounted adjacent, and for adjustment longitudinally of, the central portion of the track and adapted releasably to lock the trucks when they are shifted inwards to said central portion of the track, means for conjointly releasing the latches, and means for conjointly adjusting the latches to and from one another, including an operative connection between said latches.

7. A hoisting apparatus comprising an overhead track, a pair of wheel supported trucks mounted to travel along the track and having vertically movable load carrying hoist blocks suspended therefrom and in addition latches for releasably locking the blocks when they are raised adjacent the trucks, means for conjointly releasing the latches, and means for conjointly shifting the trucks to and from one another.

8. A hoisting apparatus comprising an overhead track, a pair of wheel equipped trucks mounted to travel on the track and each having a vertically movable load carrying hoist block suspended therefrom and also latch means for releasably locking the block thereto when it is raised to its fullest extent, means for conjointly releasing the two latch means, means for conjointly shifting the trucks to and from one another, latches for locking the trucks when they are shifted into certain positions on the track, and means for conjointly releasing said latches.

9. A hoisting apparatus comprising an overhead track, a pair of trucks mounted to travel on opposite ends of the track and each having a vertically movable load carrying hoist block suspended therefrom, and in addition a latch for releasably locking the block thereto when it is raised to its fullest extent, means for conjointly releasing the two block locking latches, means for conjointly shifting the trucks to and from one another, latches at the extremities of the track for locking the trucks when they are shifted to the extremities of the track, means for conjointly releasing the last mentioned latches, latches adjacent the central portion of the track for releasably locking the trucks in place when they are shifted inwards to said central portion of the track, and means for conjointly releasing the latch adjacent said central portion of the track.

10. A hoisting apparatus comprising an overhead track, a pair of trucks mounted to travel on opposite ends of the track and having vertically movable load carrying hoist blocks suspended therefrom, and latches for locking the blocks thereto when they are raised adjacent said trucks, a pair of latches mounted at the extremities of the track for releasably locking the trucks when they are shifted outwards to said extremities of the track, latches adjacent the central portion of the track for releasably locking the trucks in place when they are shifted inwards to the central portion of the track, and means including a single cable system for lowering or raising the blocks conjointly after the trucks are locked in place by either pair of latches therefor and the latches for locking the blocks to the trucks are released, for shifting the trucks conjointly inwards after the blocks are latched to the trucks and the latches at the extremities of the tracks are released, and for shifting the trucks conjointly outwards after the blocks are latched to the trucks and the latches adjacent the central portion of the track are released.

11. A hoisting apparatus adapted for use in connection with a vehicle and comprising an overhead track mounted on the vehicle so that it extends transversely thereof and its mid point is adjacent the center of the vehicle, a pair of wheel equipped trucks mounted to travel on opposite ends of the track and each provided with vertically movable hoist means, and means for conjointly shifting the trucks to and from one another while at the same time maintaining the trucks so that they are spaced equidistantly from the center of the track.

12. A hoisting apparatus adapted for use in connection with a vehicle and comprising an overhead track mounted on the vehicle so that it extends transversely thereof and its mid point is adjacent the center of the vehicle, a pair of trucks mounted to travel on opposite ends of the track and each provided with vertically movable hoist means, a pair of stops adapted to limit travel of the trucks along the track, positioned adjacent, and adjustable longitudinally of, certain portions of the track, and located equidistantly from the center of the track, means for conjointly adjusting the stops to and from one another, including an operative connection between said stops, and means for conjointly shifting the trucks to and from one another.

13. In an airplane having a fuselage and a pair of oppositely extending hollow wing sections connected to, and communicating with the fuselage, a hoisting apparatus comprising an overhead track having the central portion thereof extending across the fuselage interior and its ends projecting into the wing sections, a pair of trucks mounted to travel on the track back and forth between the central portion thereof and its ends and each provided with vertically movable load carrying hoist means, and means for conjointly shifting the trucks to and from one another while at the same time maintaining them so that they are spaced equidistantly from the track center.

GEORGE E. BOCK.